Nov. 6, 1928.

E. C. SASNETT 1,690,459

AUTOMATIC TRAIN CONTROL SYSTEM

Filed Aug. 7, 1925

Edward C. Sasnett
Inventor

Patented Nov. 6, 1928.

1,690,459

UNITED STATES PATENT OFFICE.

EDWARD C. SASNETT, OF WASHINGTON, DISTRICT OF COLUMBIA.

AUTOMATIC TRAIN-CONTROL SYSTEM.

Application filed August 7, 1925. Serial No. 48,747.

The present invention relates to railway signalling systems of that type wherein the indications are given on a vehicle or in the cab of a locomotive.

The invention has for its object to provide a system which gives substantially continuous indications by means of timed electrical impulses transmitted to the vehicle system from wayside points. It is also an object of the invention to provide a system in which the necessity for insulated rail joints, track batteries and track relays is eliminated.

Figures 1, 2:
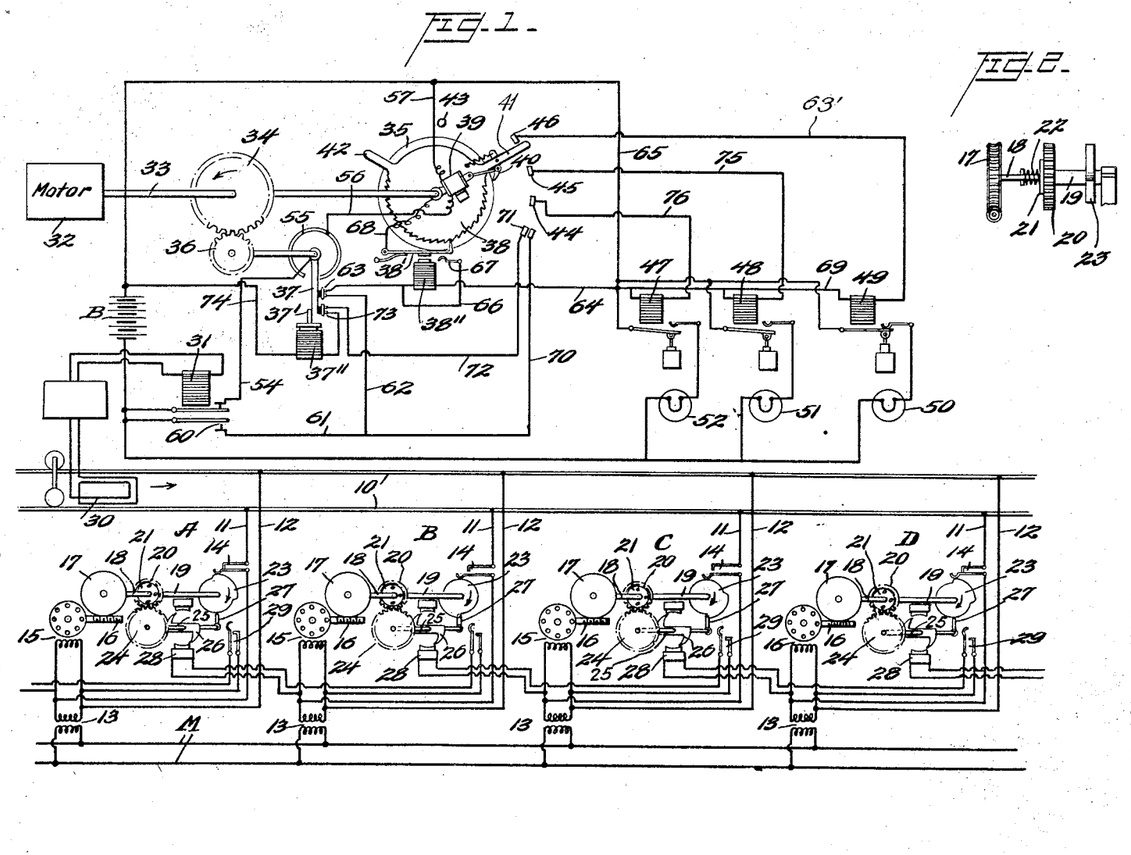
Fig. 1 of the accompanying drawings is a diagrammatic view of a system embodying the invention.
Fig. 2 is a detail view.

Referring to the drawing, 10 designates a stretch of track conductively continuous throughout. Connected across the rails at regularly spaced stations A, B, C and D are conductors 11 and 12 leading respectively to the terminals of transformers 13, the primaries of these transformers being connected across alternating current power mains M. A switch 14 is inserted in the conductor 11 and is adapted to be periodically operated by mechanism hereinafter described, so as to impress the voltages of the secondaries across the track rails at certain intervals.

There is provided at each station a single phase motor 15 fed from the secondary of the respective transformer. Rigid with the armature of each of these motors is a worm shaft 16 meshing with a worm wheel 17 secured on a shaft 18. Rotatable on shaft 18 is a sleeve 19 rigid with which is a gear 20 frictionally engaged by a disk 21 splined on shaft 18, a spring 22 effecting a suitable pressure between the disks. (Fig. 2). Secured to sleeve 19 is a cam 23 having raised portions adapted to operate circuit controllers 14.

Meshing with gear 20 is a gear 24 rigid with a shaft 25 and also rigid with shaft. 25 is a Z-shaped armature 26 and an arm 27. Armature 26 has convex pole faces coacting with the concave pole faces of magnets 28. Arm 27 is adapted to close a circuit controller 29 for an instant at a certain point in each revolution of shaft 25. Gear 24 is exactly half the diameter of gear 20, so that arm 27 makes one revolution to two revolutions of cam 23.

It will be observed that when arm 27 closes switch 29 at any given station, the circuit of magnet 28 immediately in rear thereof is closed. If the raised portions of cams 23 at the two stations are in correct relative positions, armature 26 at the rear station will lie in the magnetic axis of magnets 28 when switch 29 at the advance station is closed. If the raised portions are not in correct relative positions, armature 26 at the rear station will be drawn into the magnetic axis rotating the cam at the rear station, this adjustment being permitted by the frictional connection of the cam with driving shaft 18.

Each cam 23 comprises a raised portion which extends through an angle of approximately 90°. The stations are arranged in successive groups of three with the said raised portions at stations of the same group extending through different quadrants at any given instant, and with the raised portions at corresponding stations of all the groups extending through the same quadrant. In the instantaneous positions shown on the drawing, at station D the raised portion extends through the quadrant 0°–90°; at station C the raised portion extends through the quadrant 90°–180°; and at station B the raised portion extends through the quadrant 180°–270°. Stations B, C and D constitute one group. At station A the raised portion extends through the quadrant 0°–90°, the same as at station D, station A being the last station to the left of group B, C, D, it being understood that the group E, F, G (not shown) at the right of group B, C, D have raised portions respectively occupying the same quadrants occupied by the raised portions at stations B, C and D.

If it be assumed that shaft 19 at all stations rotates in the direction of the arrow once every four seconds, it will be understood from the foregoing that switches 14 are closed at each station for a period of one second and are opened for a period of three seconds, and that the switches are successively operated at stations in the same group and are synchronously operated at corresponding stations in the several groups.

In the drawings the switches 14 at stations A and D are closed, but the raised portions of the cams are just on the point of leaving them, so that an instant later these switches open. It will be observed that when the switches 14 at stations A and D open there will be a one second period in which the switch at no station will be closed, following this one second period the switch at station B, and at all stations corresponding thereto throughout the system, will close and remain closed for a period of one second, following which the switch at station C and corresponding stations will close for a period of one second and then the switch at station D, and corresponding stations, will close for a period of one second, following which there will be a period of one second in which none of the switches are closed, and so on. It will be understood therefore that with a vehicle at any given position on the track, alternating current will flow through the rails and through the wheels and axles of the vehicle for successive periods of three seconds separated by an interval of one second in which no current flows, provided there is not another vehicle in any of the three blocks immediately in advance, a block being the stretch of track between adjacent connections of conductors 11 and 12.

The drawing shows a vehicle, represented by a pair of wheels and axle, at the left of station A. This vehicle is provided with a coil 30 disposed in inductive relation to the track rails so that alternating current flowing through the rails in opposite directions induces additive electromotive forces in the two sides of the coil. These alternating electromotive forces produce an alternating current flow through an amplifier, the latter causing a magnified current flow through an electromagnetic relay 31.

The vehicle also carries a constant speed motor 32 of any suitable character, either electrical or mechanical. This motor drives a shaft 33 on which is fixed a gear wheel 34 and a disk 35. Gear 34 meshes with a smaller gear 36 on the shaft of which is frictionally secured an arm 37 which is adapted to be stopped independently of the rotation of the shaft by a pin 37′ rigid with the plunger of a solenoid 37″, said pin projecting into the path of arm 37 when the solenoid is deenergized.

Rotatably mounted on shaft 33 is a disk 38 adapted to be clutched to the shaft by any suitable "slot" device. For this purpose there is secured to the face of the disk a solenoid 39 having its plunger connected to a pawl, or shoe, 40 pivoted on an arm 41 rigid with disk 38, whereby when the solenoid is energized shoe 40 is drawn into frictional engagement with the periphery of disk 35 so that the two disks rotate together, and when the solenoid is deenergized disk 38 returns by gravity to its initial position, wherein it is stopped by engagement of an arm 42 with a stop pin 43.

Arm 41 is adapted to engage any of a series of three contacts 44, 45 and 46 connected respectively to magnets 47, 48 and 49. The armatures of these magnets are connected to dash pots of any suitable construction allowing a quick pick up of the armatures but retarding the return movements. A green lamp 50 is illuminated when the contacts controlled by magnet 49 are closed; a yellow lamp 51 is in a similar way controlled by magnet 48 and a red lamp 52 by magnet 47, the circuits of these lamps being obvious from the drawings.

As before pointed out, circuit controllers 14 at stations A and D and corresponding stations are closed but are on the point of being opened by the passage therefromunder of the raised portions of the cams. Relay 31 is accordingly energized and closes a circuit from battery B, conductor 54, arm 37, contact segment 55, conductor 56, solenoid 39 and back to battery through conductor 57. Disk 38 is therefore clutched to disk 35 and is rotating therewith. When the circuit controllers open, arm 41 has moved into engagement with contact 46. The opening of relay 31 opens the circuit of solenoid 39, but disk 38 is held in its operated position by a pawl 38′. The opening of the relay also closes at its back contact a circuit through a magnet 38″ controlling pawl 38′, this circuit being from battery B, back contact 60, conductors 61 and 62, contacts 63, magnet 38″, and back to battery through conductors 64 and 65.

It may be here stated that the speed of the motor and the gearing connecting arm 37 with shaft 33 are so chosen that arm 37 rotates at a somewhat greater angular velocity than that of cams 23. If it be assumed that these cams make one revolution per four seconds, it may be assumed that arm 37 makes one revolution per three and a half seconds.

Contacts 63 are bridged by an insulated brush on arm 37 when the arm is stopped by pin 37′ in the position shown. Magnet 38″ draws down pawl 38′ and closes the following circuit an instant in advance of releasing disk 38: battery B, back contact 60, conductors 61 and 62, contacts 63, conductor 66, spring contact 67, pawl 38′, conductor 68, arm 41, contact 46, conductor 63′, magnet 49, and back to battery through conductors 69 and 65. Magnet 49 receives a short impulse and then disk 38 is released by pawl 38′ and returns to initial position, where it is stopped by engagement of arm 42 with stop 43. When arm 41 reaches initial position, the following circuit is closed: battery B, back contact 60, conductors 61 and 70, contacts 71 (bridged by arm 41 when in initial position), conductor 72, contacts 73 (closed by an insulated brush on arm 37) solenoid 37'' and back to battery through conductor 74. The closing of this circuit releases arm 37, which then rotates with gear 36 due to its frictional connection therewith. When current is again transmitted through relay 31, this time by the operation of the raised portion on cam 23 at station B, arm 37 is in engagement with segment 55 and maintains engagement therewith throughout the remainder of its revolution and until shortly after its release.

From the foregoing it will be understood that current will be transmitted through the rails and wheels and axles of the vehicle, under clear conditions, for successive periods of three seconds separated by an interval of one second, due to the successive closures of circuit controllers 14 at stations B, C and D and stations corresponding respectively thereto. During the three second period relay 31 will be continuously energized to hold disk 38 clutched to shaft 33, whereby at the end of the three second period arm 41 will engage contact 46. On cessation of current at the end of the three second period, magnet 38'' is first energized and successively sends an impulse through magnet 49 and releases disk 38. Then when disk 38 resumes initial position, solenoid 37'' is energized and releases arm 37, which then makes another revolution, and the cycle of operations is repeated. Thus under clear conditions magnet 49 is intermittently energized at four second intervals. As long as this condition continues the dash pot connected with armature of magnet 49 prevents the armature from falling far enough to open the circuit of clear lamp 50.

Under caution conditions, the vehicle relay is influenced by controllers 14 at only the two stations immediately in advance. Suppose, for instance, that an advance vehicle is in the block between stations B and C. Current would then be transmitted to the rear vehicle when the controllers 14 are closed at stations A and B only. It will be observed that the raised portions on cams 23 at these stations are displaced 180°, and it will be obvious that current will be transmitted to the rear vehicle in impulses of one second duration separated by an interval of one second. That is to say, during each revolution of arm 37 solenoid 39 will be energized for a period of one second, then deenergized for a period of one second and finally energized for a period of one second. During the one second interval in which the solenoid is deenergized, however, disk 38 is held in its operated position by pawl 38' and will continue movement from this position when the solenoid is again energized. The net result is that arm 41 will be moved into engagement with contact 45, when, or an instant after, arm 37 is stopped by pin 37'. On cessation of current therefore, at the end of the second one-second period, an impulse will be sent through the following circuit: battery B, back contact 60, conductors 61 and 62, contacts 63, conductor 66, contact 67, pawl 38', conductor 68, arm 41, contact 45, conductor 75, magnet 48, and back to battery through conductor 65. Magnet 48 operates to close the circuit of the caution lamp 51. Disk 38 will then be released, returning to initial position, following which solenoid 37'' will be energized to release arm 37, whereupon another cycle of operations will be repeated. Thus under caution conditions impulses are sent through magnet 48 at four second intervals and the circuit of the caution lamp is continuously closed. As impulses are no longer being sent through magnet 49, the clear lamp 50 will go out.

Where, under caution conditions, the two intervening stations are of the same group, as for example stations B and C, current will be transmitted to the rear vehicle in impulses of two seconds duration separated by an interval of two seconds. However, the net result on the vehicle will be the same as when the two intervening stations belong to different groups, as stations A and B. In both cases, solenoid 39 is energized for two seconds during each cycle of operations and therefore causes arm 41 to be operated through the same angle.

Under danger conditions, only one station is between the two vehicles, and of course current impulses will be transmitted to the rear vehicle of one second duration separated by an interval of three seconds. That is, during each revolution of arm 37 solenoid 39 will be energized for a period of one second only, and during this time the arm will move into engagement with contact 44. Hence at the cessation of the one second impulse and with arm 37 stopped in the position shown a circuit will be closed through magnet 47 by way of back contact 60, conductors 61 and 62, contacts 63, conductor 66, contact 67, pawl 38', conductor 68, arm 41, contact 44, conductor 76, magnet 47, and back to battery through conductor 65. These impulses will be sent through magnet 47 once each cycle, or every four seconds, and will accordingly maintain the circuit of danger lamp 52 closed.

The system described will give substantially continuous indication as to the condition of three blocks in advance. The system is responsive to timed current impulses and operates selectively according to the length of time current is received during a given period.

Figure 3:
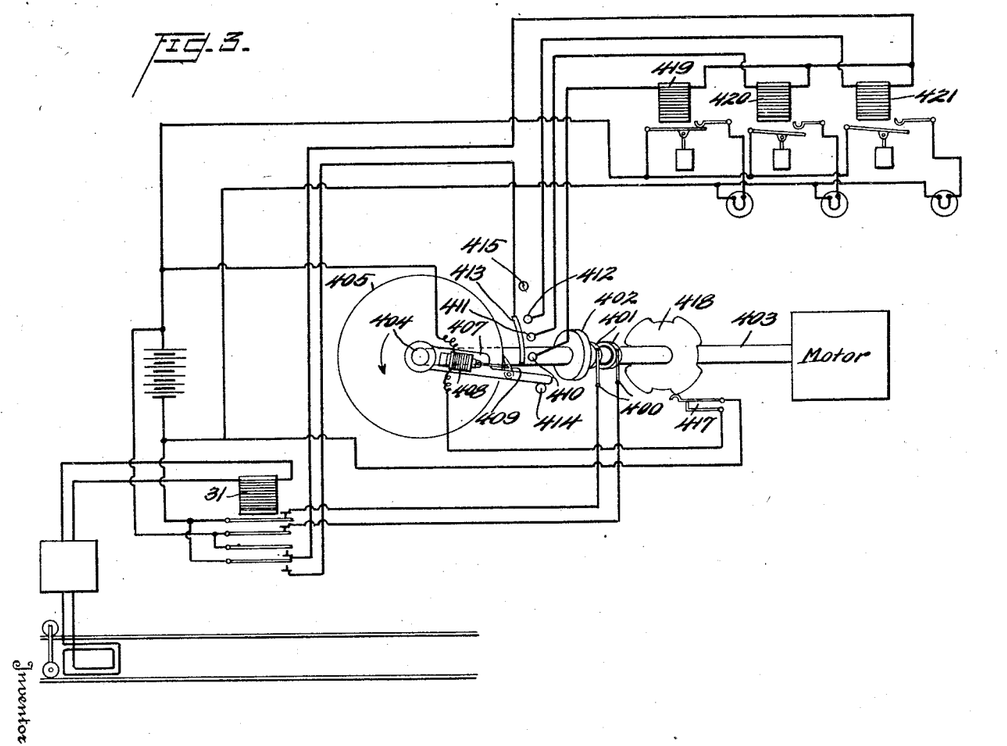
Figs. 3 and 4 are diagrammatic views of modifications.

Fig. 3 shows a modification of the vehicle equipment adapted for use with a track system such as described above. In this modification, the front contacts of vehicle relay 31 are connected to brushes 400 which engage collector rings 401 connected to the terminals of an electromagnetic clutch 402. Clutch 402, when energized, connects a motor driven shaft 403 to a shaft 404 which has secured thereon a disk 405. Loosely mounted on shaft 404 is an arm 407 carrying a solenoid 408. Pivoted near the outer end of the arm is a pawl 409 connected on one side of its pivot to the plunger of solenoid 408, whereby when the solenoid is energized pawl 409 is drawn into frictional engagement with the periphery of disk 405 and when the solenoid is deenergized arm 408 falls by gravity to the position shown. Arm 407 carries a brush adapted to sweep over contacts 410, 411 and 412 and connect these contacts respectively with a contact segment 413. The angle through which arm 407 is adapted to be operated is defined by the fixed stops 414 and 415.

When motor shaft 403 is connected to shaft 404, wheel 405 is rotated in the direction of the arrow. The circuit of solenoid 408 includes spring contacts 417 which are adapted to be closed for a predetermined time at regularly recurring intervals by a cam 418 secured to the motor shaft. When the brush on arm 407 bridges contacts 410 and 413 and relay 31 is deenergized, a circuit is closed through magnet 419. And when contacts 411 and 412 are connected to contact segment 413 circuits are closed respectively through magnets 420 and 421. The armatures of these magnets are connected to dash pots, as in the previously described system, whereby when the magnets are energized momentarily the contacts controlled thereby remain closed for a predetermined time after the magnets are deenergized. Magnets 418, 420 and 421 control respectively the circuits of a red, a yellow and a green lamp, indicating danger, caution and clear.

The vehicle carried motor is designed to operate at such a speed that cam 408 will close spring contacts 417 for a period of four seconds and then permit these contacts to open for a brief interval.

Under clear conditions, it will be recalled, the vehicle relay 31 is energized for successive periods of three seconds separated by an interval of one second. Under these conditions therefore clutch 402 is energized for successive periods of three seconds, clutching the motor shaft 303 to shaft 404 and causing wheel 405 to rotate in the direction of the arrow. During three seconds of the four-second interval in which solenoid 408 is energized to clutch arm 407 to wheel 405 arm 407 will move with wheel 405, and at the end of this three second movement the arm will bridge contacts 412 and 413. At the end of the three seconds the vehicle relay 31 drops its contacts and the circuit of magnet 421 is closed, causing the green lamp to light. When springs 417 separate, at the end of the four second period, solenoid 408 is deenergized and arm 407 drops to initial position. These operations will be repeated continuously as long as clear conditions obtain. Hence magnet 421 will be intermittently energized at four second intervals, causing the green lamp to be continuously illuminated.

Under caution conditions, the vehicle relay receives every four seconds a current impulse of two seconds duration or two current impulses of one second duration each, depending on whether the intervening stations belong to the same or different groups. Suppose the vehicle relay receives every four seconds a current impulse of two seconds duration. In such case shaft 404 will be driven by the motor for a period of two seconds every four seconds, and hence during the four-second periods in which solenoid 408 is energized and arm 407 clutched to wheel 405, arm 407 will be driven only to the position in which its brush bridges contacts 411 and 413. Hence at the termination of the two-second periods in which the vehicle relay is energized the circuit of magnet 420 is closed. Suppose, on the other hand, that the vehicle receives every four seconds two current impulses of one second duration each. The net result will obviously be the same as before, since in each case shaft 404 is operated for two seconds in the four second period in which arm 407 is clutched thereto. Under caution conditions, therefore, magnet 420 will be intermittently energized and will maintain the circuit of the yellow lamp closed.

Under danger conditions, shaft 404 will be operated during one second of the four second period in which arm 407 is clutched thereto, and the arm will move only far enough to bridge contacts 410 and 413. Therefore under danger conditions magnet 419 will be intermittently energized, closing the circuit of the red or danger lamp.

In this system, as well as in the system of Fig. 1, if there is any failure due to variations in the speed of the motor such failure will be on the side of safety as long as the speed is kept below a predetermined value. There is a bare possibility that a false clear indication may be given if the motor operates at a certain speed above this predetermined value. If a spring motor is employed, its construction will be such that the motor will be inherently incapable of operating at a speed substantially higher than the speed at which the motor is designed to operate in the system.

Figure 4:
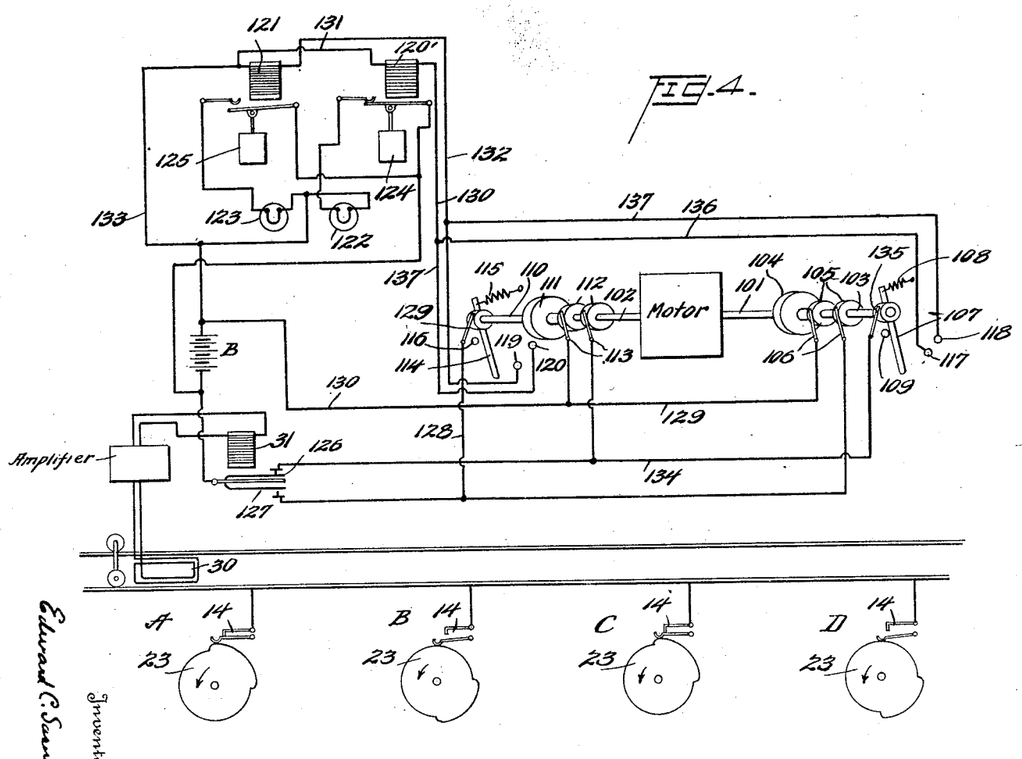

Fig. 4 shows a modification in which a clear indication is given so long as there is a full clear block in advance. Here the cams 23 have raised portions extending through arcs of 90°, as before, but the stations are arranged in groups of two instead of three. At stations of the same group the cams are displaced 90° and at corresponding stations of the several groups the cams occupy the same quadrant. At station A the raised portion of cam 23 occupies the quadrant 0°–90° and at station B, which with station A constitutes a single group, the raised portion extends through the quadrant 90°–180°. At stations C and D, the succeeding group, the raised portions of the cams occupy the same quadrants, respectively, as at stations A and B. Otherwise the track equipment of the system shown in Fig. 4 may be exactly the same as that shown by Fig. 1.

In the system of Fig. 4, a vehicle travelling under clear conditions will receive current impulses of two seconds duration separated by an interval of two seconds, and under caution conditions (the block immediately in advance occupied) it will receive current impulses of one second duration separated by an interval of three seconds, assuming, as before, that the cams make one revolution every four seconds.

As in the case of the system shown by Fig. 1, the present system includes a vehicle coil 30, an electro-magnetic relay 31 and an amplifier between the coil and relay. The vehicle also carries a constant speed motor driving a shaft 100. The motor drives shafts 101 and 102 at constant angular velocities. In alignment with shaft 101 is a shaft 103, the two shafts being adapted to be clutched together for rotation by an electro-magnetic clutch 104 having collector rings 105 and brushes 106. Fixed on the end of shaft 103 is an arm 107 biased by a spring 108 against a stop 109 when the clutch is deenergized. Similarly, a shaft 110 is adapted to be clutched to shaft 102 by an electro-magnetic clutch 111 having collector rings 112 and brushes 113. Fixed on the end of shaft 110 is an arm 114 biased by a spring 115 against a stop 116 when the clutch is deenergized. Arm 107 is adapted to engage stationary contacts 117 and 118; and arm 114 is adapted to engage stationary contacts 119 and 120. A magnet 120' having its armature connected to a dash pot 104 is controlled by contacts 120 and 117; and a magnet 121 having its armature connected to a dash pot 125 is controlled by contacts 118 and 119.

The operation of the system shown by Fig. 4 is as follows: As before pointed out, when the vehicle is traveling under clear conditions it receives current impulses of two seconds duration separated by an interval of two seconds. Under clear conditions therefore relay 31 will be energized for two seconds and deenergized for two seconds every four seconds. When the relay is energized the circuit of clutch 111 is closed at its front contact spring 126 and arm 114 rotates in a counter-clockwise direction. As shown the circuit controllers 14 at stations A and C have just been closed and arm 114 is shown slightly removed from its initial position against stop 116. At the end of the two second interval in which relay 31 is energized, arm 114 will be in engagement with contact 120, and when relay 31 drops the following circuit will be closed slightly in advance of the opening of the circuit through the clutch 111: battery B, back contact spring 127, conductor 128, brush 129, arm 114, contact 120, conductors 137 and 130, magnet 120', and conductors 131 and 133 back to battery. This circuit will be closed only momentarily, as immediately following its closure the circuit of clutch 111 is broken at the front contact spring 126, and arm 114 is drawn by spring 115 against stop 116. The dropping of relay 31 also closed at back contact spring 127 the circuit of clutch 103 and this circuit remains closed for the two second interval in which relay 31 is deenergized. At the end of this two second interval arm 107 engages contact 117, and when relay 31 picks up the following circuit is closed momentarily in advance of the opening of the circuit through clutch 104: battery B, front contact spring 126, conductor 134, brush 135, arm 107, contact 117, conductors 136 and 130, magnet 120' and back to battery through conductors 131 and 133. Thus under clear conditions, at the end of the two second period in which relay 31 is energized an impulse is sent through magnet 120' through the operation of arm 114, and at the end of the two second interval in which the relay is deenergized an impulse is also sent through magnet 120' through the operation of arm 107. These impulses are sufficient to enable the magnet to draw its armature to the fully raised position. Dash pot 124 is constructed so that it will retard the downward movement of the armature long enough to hold closed the circuit of clear lamp 124 between these impulses. If the interval between successive impulses, however, exceeds two seconds, the circuit of the clear lamp will be interrupted.

Under caution conditions, relay 31 will be energized for one second and deenergized for three seconds, every four seconds. At the end of the one second period, arm 114 engages contact 119, and when the relay drops the following circuit is momentarily closed in advance of the deenergization of clutch 111: battery B, back contact spring 127, conductor 128, brush 129, arm 114, contact 119, conductor 132, magnet 121 and back to battery through conductor 133. At the end of the three second interval in which relay 31 is deenergized arm 107 engages contact 118 and when the relay picks up the following circuit is closed in advance of the deenergization of clutch 104: battery B, back contact spring 127, conductor 134, brush 135, arm 107, contact 118, conductor 137, conductor 132, magnet 121, and back to battery through conductor 133. Thus under caution conditions impulses are sent through magnet 121, the maximum interval between impulses being three seconds. Hence dash pot 125 is constructed so that it will cause the opening of the circuit through caution lamp 123 when the interval between impulses exceeds three seconds.

Various changes in the system described and other substantially different modifications may be employed without departing from the scope of the invention as defined in the claims.

I claim:

1. A railway signalling system including a stretch of track the rails of which are conductively continuous, means for connecting alternating electrical energy intermittently across the track rails at suitably spaced points, said means operating to connect energy at said points asynchronously, and signalling means for the stretch responsive to said energy and adapted to give different indications according to the number of points from which energy is transmitted thereto.

2. A railway signalling system including a stretch of track the rails of which are conductively continuous throughout, means for connecting alternating electrical energy intermittently across the track rails at spaced points, said means operating to connect energy at said points asynchronously, a vehicle travelling on the track provided with a translating device responsive to said energy, and signalling means controlled by the translating device adapted to give different indications according to the number of points along the track from which energy is transmitted thereto.

3. A railway signalling system including a stretch of track, means for connecting electrical energy intermittently across the rails at suitably spaced points, said points being arranged in successive groups and said means operating to connect energy at points in the same group asynchronously and to connect energy at corresponding points in the several groups synchronously, and signalling means responsive to said energy.

4. A railway signalling system including a stretch of track, motors at spaced points along the track, circuit controllers operated by said motors for intermittently connecting electrical energy across the track rails, means for adjusting said circuit controllers, and signalling means for the stretch responsive to said energy.

5. A railway signalling system including a stretch of track the rails of which are conductively continuous, motors at spaced points along the track, circuit controllers operated by said motors for intermittently connecting energy across the rails, means for adjusting said circuit controllers, a vehicle travelling along the track and provided with a translating device responsive to said energy, a motor on the vehicle operating at constant speed, and signalling means under the joint control of the motor and translating device.

6. A railway signalling system including a stretch of track, motors at spaced points along the track, circuit controllers operated by said motors for intermittently connecting energy across the track rails, means for adjusting said circuit controllers, the controllers being arranged in successive groups with controllers of the same group operating successively and corresponding controllers of all the groups operating synchronously, a vehicle travelling on the track provided with a translating device responsive to said energy and with a constant speed motor, and signalling means under the joint control of the translating device and motor.

7. A railway signalling system including a stretch of track, motors at spaced points along the track, circuit controllers operated by said motors for intermittently connecting energy across the track rails, means for adjusting said circuit controllers, the controllers being arranged in successive groups with controllers of the same group operating successively and corresponding controllers of all the groups operating synchronously, a vehicle travelling on the track provided with a translating device responsive to said energy, and signalling means controlled by said translating device.

8. A railway signalling system including a stretch of track, motors at spaced points along the track, circuit controllers operated by said motors for intermittently connecting alternating energy across the rails, means for adjusting said circuit controllers, the controllers being arranged in successive groups with controllers of the same group operating successively and slightly overlapping in operation and with corresponding controllers of all the groups operating synchronously, in combination with a vehicle equipment including a coil disposed in inductive relation to the rails, a translating device connected to the coil, a timing device, and train governing mechanism controlled jointly by the translating and timing devices, so as to give different indications according to the duration of the time intervals in which said translating device is energized.

9. A railway signalling system including a stretch of track, means for connecting electrical energy across the track rails at spaced points, said points being arranged in successive groups and said means operating to connect energy across the rails at points in the same group successively and at corresponding points in the several groups synchronously, in combination with a vehicle equipment including a translating device responsive to said energy, a timing device, and train governing mechanism controlled jointly by the translating and timing devices, so as to give different indications according to the duration of the time intervals in which said translating device is energized.

10. In an automatic train control system, means for transmitting to a vehicle electrical impulses varying in duration, in combination with a vehicle equipment including a translating device responsive to said impulses, a motor, a shaft driven by the motor, a member controlled by said translating device so as to be clutched to said shaft during the time impulses are being received, a second member biased to an initial position, means controlled by the motor for clutching the second member to the first member for a fixed interval of time, and means for giving different indications according to the extent of movement of the second member.

11. In an automatic train control system, means for transmitting to a vehicle electrical impulses varying in duration according to traffic conditions, in combination with a vehicle equipment including a translating device responsive to the impulses, a member controlled by the translating device so as to be driven at a constant rate during the time impulses are being received, a second member clutched to the first member for predetermined intervals of time and biased to assume an initial position when unclutched, and means for giving different indications according to the extent of movement of the second member.

12. In an automatic train control system, means for transmitting to a vehicle electrical impulses varying in duration, in combination with a vehicle equipment including a translating device responsive to said impulses and a motor operating at a substantially constant speed, a pivoted arm biased to an initial position, a shaft, means controlled by the translating device for clutching the shaft to the motor during the time impulses are being received, means for clutching said arm to said shaft at regularly recurring intervals for a constant period of time, and means for giving different indications according to the angle through which the arm is moved.

13. A railway signalling system, including a stretch of track and a vehicle travelling thereon, a translating device on the vehicle, means for transmitting electrical energy through said translating device including motors at spaced points along the track and circuit controllers operated thereby, means for adjusting said circuit controllers, and train control mechanism governed by said translating device.

14. A railway signalling system including a stretch of track and a vehicle travelling thereon, a translating device on the vehicle, means for transmitting electrical energy through said translating device including motors at spaced points along the track and circuit controllers operated thereby, periodically operating means for adjusting the relative positions of said circuit controllers, and train control mechanism governed by said translating device.

15. In a railway signalling system, a vehicle having a translating device and train-control mechanism governed thereby, a conductor, means for transmitting electrical energy through said conductor to said translating device including circuit controllers connected to said conductor at spaced points and motors operating said circuit controllers, and automatic means periodically adjusting said circuit controllers to maintain them in fixed relative positions.

16. In a railway signalling system of the kind described, circuit controllers transmitting signalling energy located at spaced points along the track, cams operating said circuit controllers, motors operating said cams, friction connections between said cams and motors, and means for adjusting said cams including a field and an armature one of which is fixed and the other of which rotates with the cam.

17. In a railway signalling system of the kind described, circuit controllers transmitting signalling energy located at spaced points along the track, a motor associated with each circuit controller, and means for adjusting said circuit controllers with respect to the driving shaft of the motor including a field and an armature one of which is fixed and the other of which rotates with the circuit controller.

18. In a railway signalling system of the kind described, circuit controllers transmitting signalling energy located at spaced points along the track, motors driving said circuit controllers, and means for adjusting said circuit controllers with respect to the driving shafts of the motors including a field and an armature one of which is fixed and the other of which rotates with the circuit controller and means for exciting the field associated with one circuit controller when an adjacent circuit controller is in a certain position.

19. In a railway signalling system, a vehicle having a translating device and train control mechanism governed thereby, a stationary conductor adapted to transmit electrical energy to said translating device, and means for intermittently connecting electrical energy to said conductor at spaced points, said points being arranged in successive groups and said means operating to connect energy at points in the same group asynchronously and to connect energy at corresponding points in the several groups synchronously.

20. The method of controlling railway vehicles, which consists in connecting electrical energy across the track rails asynchronously at a plurality of points in advance of a vehicle, and controlling the vehicle in accordance with the number of points from which energy is transmitted thereto asynchronously.

21. The method of controlling railway vehicles, which consists in connecting electrical energy across the track rails successively and periodically at a plurality of spaced points in advance of a vehicle, and controlling the vehicle in accordance with the number of points from which energy is transmitted thereto.

In testimony whereof I hereunto affix my signature.

EDWARD C. SASNETT.